US012750888B2

(12) United States Patent
You et al.

(10) Patent No.: US 12,750,888 B2
(45) Date of Patent: Sep. 29, 2026

(54) RANDOM ACCESS METHOD AND APPARATUS

(71) Applicant: Huawei Technologies Co., Ltd., Shenzhen (CN)

(72) Inventors: Chunhua You, Shanghai (CN); Yinghao Guo, Shanghai (CN); Dawid Koziol, Munich (DE); Yulong Shi, Beijing (CN); Lei Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 18/432,504

(22) Filed: Feb. 5, 2024

(65) Prior Publication Data

US 2024/0179750 A1 May 30, 2024

Related U.S. Application Data

(63) Continuation of application No. PCT/CN2022/108824, filed on Jul. 29, 2022.

(30) Foreign Application Priority Data

Aug. 6, 2021 (CN) ......................... 202110901791.5

(51) Int. Cl.

*H04W 74/0833* (2024.01)
*H04W 68/00* (2009.01)
*H04W 74/00* (2009.01)

(52) U.S. Cl.

CPC ..... *H04W 74/0833* (2013.01); *H04W 68/005* (2013.01); *H04W 74/002* (2013.01)

(58) Field of Classification Search

CPC ........... H04W 74/0833; H04W 68/005; H04W 74/002; H04W 68/00; H04W 74/006; Y02D 30/70

(Continued)

(56) References Cited

U.S. PATENT DOCUMENTS 11,330,639 B2 * 5/2022 Islam .................. H04W 74/004
11,690,097 B2 * 6/2023 Yang ....................... H04L 5/001 370/329

(Continued)

FOREIGN PATENT DOCUMENTS

CN 111565473 A 8/2020
WO WO-2020164527 A1 * 8/2020 ........ H04W 74/0833

(Continued)

OTHER PUBLICATIONS

Ericsson: "RACH partitioning for Rel-17 features", 3GPP Draft; R2-2108253, 3rd Generation Partnership Project (3GPP), Mobile Competence Centre; 650, Route Deslucioles; F-06921 Sophia-Antipolis Cedex; France, RAN WG2, Electronic meeting; Aug. 5, 2021 (Aug. 5, 2021), XP052032507, total 11 pages.

(Continued)

*Primary Examiner* — Mahendra R Patel
(74) *Attorney, Agent, or Firm* — Slater Matsil, LLP

(57) ABSTRACT

A random access method and apparatus are provided. The method includes: The terminal device receives system information that indicates a first random access configuration of N first features of a network device, one first feature is one feature or one feature combination, the first random access configuration includes M first configurations and N second configurations, there is a correspondence between the M first configurations and the N second configurations, and M and N are positive integers. The terminal device initiates random access based on the first random access configuration. A random access configuration is for the N first features, and the first configuration is a shared configuration. The shared configuration may be a parameter shared by a plurality of first features. The second configuration is a dedicated configuration and is a configuration applicable to the one first feature.

17 Claims, 4 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2016/0295609 | A1* | 10/2016 | Vajapeyam | H04W 74/006 |
| 2019/0223227 | A1* | 7/2019 | Jiang | H04L 5/001 |
| 2019/0335512 | A1* | 10/2019 | Shi | H04W 74/0833 |

FOREIGN PATENT DOCUMENTS

| | | | | | |
|---|---|---|---|---|---|
| WO | 2021031112 | A1 | | 2/2021 | |
| WO | WO-2021087929 | A1 | * | 5/2021 | H04W 74/0808 |

OTHER PUBLICATIONS

Xiaomi: "RACH partitioning common design for Rel-17 features (SDT, CovEnh, RedCap, RAN slicing)," 3GPP Draft; R2-2107244, 3rd Generation Partnership Project (3GPP), Mobilecompetence Centre; 650, Route Des Lucioles; F-06921Sophia-Antipolis Cedex; France, RAN WG2, electronic; Aug. 9, 2021-Aug. 27, 2021, Aug. 5, 2021 (Aug. 5, 2021), XP052042880, total 4 pages.

3GPP TS 38.300 V16.6.0 (Jun. 2021), 3rd Generation Partnership Project; Technical Specification Group Radio Access Network; NR; NR and NG-RAN Overall Description; Stage 2 (Release 16), total 152 pages.

3GPP TS 38.331 V16.5.0 (Jun. 2021), 3rd Generation Partnership Project; Technical Specification Group Radio Access Network; NR; Radio Resource Control (RRC) protocol specification (Release 16), total 961 pages.

3GPP TSG-RAN WG2 #114e, RACH partitioning for Rel-17 features, Ericsson, R2-2104933, Electronic meeting, May 19, 2021-May 27, 2021, total 6 pages.

3GPP TSG-RAN2#114e, SDT RACH resource configuration and coordination with other WIs (RedCap, Coverage-ext, RAN-Slicing) , ZTE Corporation, R2-2106452, Electronic meeting, May 19-27, 2021, total 8 pages.

* cited by examiner

RANDOM ACCESS METHOD AND APPARATUS

CROSS-REFERENCE TO RELATED APPLICATIONS

This application is a continuation of International Application No. PCT/CN2022/108824, filed on Jul. 29, 2022, which claims priority to Chinese Patent Application No. 202110901791.5, filed on Aug. 6, 2021. The disclosures of the aforementioned applications are hereby incorporated by reference in their entireties.

TECHNICAL FIELD

Embodiments of this application relate to the field of communication technologies, and in particular, to a random access method and apparatus.

BACKGROUND

In a communication system, a terminal device may indicate different information to a network side in a random access process. Random access may have different features based on the different indicated information.

In the conventional technology, a network device configures a set of random access parameters for the terminal device for each feature. The set of random access parameters includes all parameters used for random access. A larger quantity of features indicates a larger quantity of random access parameters configured by the network device, and a larger quantity of random access parameters received by the terminal device. Consequently, power consumption is increased.

SUMMARY

Embodiments of this application provide a random access method and apparatus, to reduce power consumption of a terminal device receiving a random access parameter corresponding to a feature.

According to a first aspect, a random access method is provided, and the method may be performed by a terminal device, or may be performed by a component of the terminal device. The method may be implemented by using the following steps, including the terminal device receives system information of a network device, where the system information indicates a first random access configuration of N first features, one first feature is one feature or one feature combination, the first random access configuration includes M first configurations and N second configurations, there is a correspondence between the M first configurations and the N second configurations, and M and N are positive integers. The terminal device initiates random access based on the first random access configuration. It can be learned that in this solution, an entire set of random access parameters is not separately sent for each feature, but a random access configuration is for the N first features, and the first configuration is a shared configuration. The shared configuration may be a parameter shared by a plurality of first features. The second configuration is a dedicated configuration and is a configuration applicable to one first feature. In this way, resources for transmission of the random access configuration may be reduced, power consumption of the terminal device receiving the random access configuration may be reduced, and energy consumption of a system may be reduced.

According to the first aspect, in a possible design, the terminal device receives a paging message of the network device, where the paging message carries information about a second feature, the information about the second feature indicates a feature or a feature combination that corresponds to downlink data to be received by the terminal device, and the second feature is one of the N first features. That the terminal device initiates random access based on the first random access configuration includes the terminal device initiates random access based on the first random access configuration, the information about the second feature, and a first configuration and a second configuration that correspond to the second feature. Because the system information received by the terminal device indicates the random access configuration of the N first features, when the downlink data arrives, the paging message carries the second feature corresponding to the downlink data, so that the terminal device can determine, from the random access configuration of the N first features based on the second feature, the configuration corresponding to the second feature. In this way, a preamble related to the second feature can be sent on a random access resource related to the second feature.

Optionally, the paging message further includes random access type information, and the random access type information indicates that a type of random access that is based on the second feature is two-step random access or four-step random access. In this way, when receiving random access configurations of the two-step random access and the four-step random access, the terminal device may determine, based on the random access type information, a random access configuration that matches the type of random access that is based on the second feature.

In a possible design, the terminal device determines a type of random access that is based on the second feature, where the second feature is one of the N first features, and the type of random access that is based on the second feature is two-step random access or four-step random access. The terminal device sends a message 1 or a message 3 to the network device on a first random access resource corresponding to the type of random access that is based on the second feature, where the message 1 or the message 3 is used to request the first random access configuration corresponding to the type of random access that is based on the second feature. The terminal device requests, from the network device, the random access configuration corresponding to the type of random access that is based on the second feature. In this way, the network device may send only the random access configuration corresponding to the type of random access that is based on the second feature, and does not need to send a random access configuration irrelevant to the type of random access that is based on the second feature. This can reduce overheads, and the terminal device can also reduce overheads of receiving the random access configuration. In addition, when there are a small quantity of users, a quantity of preambles mapped by the small quantity of users is small. The network device does not need to detect excessive preambles. However, if there are a large quantity of preambles in a random access configuration delivered by the network device, the network device still needs to detect the large quantity of preambles. Consequently, detection efficiency is low. However, in this application, when the network device sends only the random access configuration related to the type of random access that is based on the second feature, the network device may detect only a preamble related to the second feature. This effectively reduces a quantity of preambles detected by the network device.

According to a second aspect, a random access method is provided, and the method may be performed by a network device, or may be performed by a component of the network device. The method may be implemented by using the following steps, including a first network device generates system information, where the system information indicates a first random access configuration of N first features, one first feature is one feature or one feature combination, the first random access configuration includes M first configurations and N second configurations, there is a correspondence between the M first configurations and the N second configurations, and M and N are positive integers. The first network device sends the system information to a terminal device.

According to the second aspect, in a possible design, the first network device receives a first paging message of a second network device, where the first paging message carries information about a second feature, the information about the second feature indicates a feature or a feature combination that corresponds to downlink data to be received by the terminal device, and the second feature is one of the N first features. The first network device sends a second paging message to the terminal device, where the second paging message carries the information about the second feature.

Optionally, the second paging message further includes random access type information, and the random access type information indicates that a type of random access that is based on the second feature is two-step random access or four-step random access.

In a possible design, the first network device sends indication information to the terminal device, where the indication information indicates a correspondence between a random access type and a random access resource, and the random access type includes the two-step random access or the four-step random access. The first network device receives a message 1 or a message 3 on a first random access resource, where the first random access resource corresponds to a first random access type. That the first network device sends the system information to a terminal device includes the first network device sends, to the terminal device based on the message 1 or the message 3, the first random access configuration corresponding to the first random access type.

For possible designs of the second aspect, refer to the descriptions of the possible designs of the first aspect. Details are not described again.

According to the first aspect or the second aspect, this application may further provide the following several possible designs.

In a possible design, the system information further indicates a random access type of the first random access configuration, and the random access type includes the two-step random access or the four-step random access. In this way, when determining a type of random access to be initiated, the terminal device may determine, in a targeted manner, a random access configuration that matches the type of random access.

The correspondence between the M first configurations and the N second configurations may be implemented in the following two manners. Manner 1: The system information includes M pieces of first information, where the M pieces of first information indicate the M first configurations, and each of the M pieces of first information includes an identifier of one or more of the N first features.

Manner 2: The system information includes N pieces of second information, where the N pieces of second information indicate the N second configurations, and each of the N pieces of second information includes an identifier of one of the N first features and an index of one of the M first configurations.

Optionally, the terminal device receives indication information of the network device, where the indication information indicates a correspondence between a random access type and a random access resource. The terminal device determines, based on the indication information, the first random access resource corresponding to the type of random access that is based on the second feature. In this way, the random access type may be indicated in a random access process.

In a possible design, each of the N first features includes any one or any combination of the following features, including small data transmission, coverage enhancement, a slice, and a reduced capability.

According to a third aspect, a communication apparatus is provided, and the apparatus may be a terminal device, or may be a component (for example, a chip, a chip system, or a circuit) located in the terminal device. The apparatus has a function of implementing the method in any one of the first aspect or the possible designs of the first aspect. The function may be implemented by hardware, or may be implemented by hardware executing corresponding software. The hardware or software includes one or more modules corresponding to the foregoing function. In a design, the apparatus may include a processing unit and a transceiver unit. For example, the transceiver unit is configured to receive system information of a network device, where the system information indicates a first random access configuration of N first features, one first feature is one feature or one feature combination, the first random access configuration includes M first configurations and N second configurations, there is a correspondence between the M first configurations and the N second configurations, and M and N are positive integers. The processing unit is configured to initiate random access based on the first random access configuration. For more detailed descriptions of the processing unit and the transceiver unit, directly refer to the related descriptions in the first aspect. For beneficial effects of the third aspect and the possible designs, refer to the descriptions of corresponding parts in the first aspect.

According to a fourth aspect, a communication apparatus is provided, and the apparatus may be a network device, or may be a component (for example, a chip, a chip system, or a circuit) located in the network device. The apparatus has a function of implementing the method in any one of the second aspect or the possible designs of the second aspect. The function may be implemented by hardware, or may be implemented by hardware executing corresponding software. The hardware or software includes one or more modules corresponding to the foregoing function. In a design, the apparatus may include a processing unit and a transceiver unit. For example, the processing unit is configured to generate system information, where the system information indicates a first random access configuration of N first features, one first feature is one feature or one feature combination, the first random access configuration includes M first configurations and N second configurations, there is a correspondence between the M first configurations and the N second configurations, and M and N are positive integers. The transceiver unit is configured to send the system information to a terminal device. For more detailed descriptions of the processing unit and the transceiver unit, directly refer to the related descriptions in the second aspect. For beneficial effects of the fourth aspect and the possible designs, refer to the descriptions of corresponding parts in the second aspect.

According to a fifth aspect, an embodiment of this application provides a communication apparatus. The communication apparatus includes an interface circuit and a processor. The processor and the interface circuit are coupled to each other. The processor is configured to implement, by using a logic circuit or executing code instructions, the method described in the first aspect or the possible designs of the first aspect. The interface circuit is configured to receive a signal from a communication apparatus other than the communication apparatus and transmit the signal to the processor, or send a signal from the processor to a communication apparatus other than the communication apparatus. It may be understood that the interface circuit may be a transceiver or an input/output interface.

Optionally, the communication apparatus may further include a memory, configured to store instructions executed by the processor, or store input data needed by the processor to run the instructions, or store data generated after the processor runs the instructions. The memory may be a physically independent unit, or may be coupled to the processor, or the processor includes the memory.

According to a sixth aspect, an embodiment of this application provides a communication apparatus. The communication apparatus includes an interface circuit and a processor. The processor and the interface circuit are coupled to each other. The processor is configured to implement, by using a logic circuit or executing code instructions, the method described in the second aspect or the possible designs of the second aspect. The interface circuit is configured to receive a signal from a communication apparatus other than the communication apparatus and transmit the signal to the processor, or send a signal from the processor to a communication apparatus other than the communication apparatus. It may be understood that the interface circuit may be a transceiver or an input/output interface.

Optionally, the communication apparatus may further include a memory, configured to store instructions executed by the processor, or store input data needed by the processor to run the instructions, or store data generated after the processor runs the instructions. The memory may be a physically independent unit, or may be coupled to the processor, or the processor includes the memory.

According to a seventh aspect, an embodiment of this application provides a computer-readable storage medium. The computer-readable storage medium stores a computer program or readable instructions. When the computer program or readable instructions are executed by a communication apparatus, the method in the foregoing aspects or the possible designs of the aspects is performed.

According to an eighth aspect, an embodiment of this application provides a chip system. The chip system includes a processor, and may further include a memory. The memory is configured to store a program, instructions, or code. The processor is configured to execute the program, instructions, or code stored in the memory, to implement the method in the foregoing aspects or the possible designs of the foregoing aspects. The chip system may include a chip, or may include a chip and another discrete component.

According to a ninth aspect, a computer program product including instructions is provided. When the computer program product is executed by a communication apparatus, the method in the aspects or the possible designs of the aspects is performed.

DETAILED DESCRIPTION OF ILLUSTRATIVE EMBODIMENTS

Embodiments of this application provide a random access method and apparatus, to resolve a problem of high energy consumption caused by a terminal device receiving a plurality of sets of random access parameters corresponding to a plurality of features. The method and the apparatus are based on a same or similar technical concept. Because problem-resolving principles of the method and the apparatus are similar, mutual reference may be made to implementations of the apparatus and the method, and repeated parts are not described.

The random access method provided in embodiments of this application may be applied to a 4th generation (4G) communication system, for example, long term evolution (LTE), or may be applied to a 5th generation (5G) communication system, for example, a 5G new radio (NR), or may be applied to various future evolved communication systems, for example, a 6th generation (6G) communication system, or a space-air-terrestrial integration communication system. It may be understood that a system architecture and an application scenario described in embodiments of this application are intended to describe technical solutions in embodiments of this application more clearly, and do not constitute a limitation on the technical solutions provided in embodiments of this application.

The following describes in detail embodiments of this application with reference to the accompanying drawings.

Figure 1:
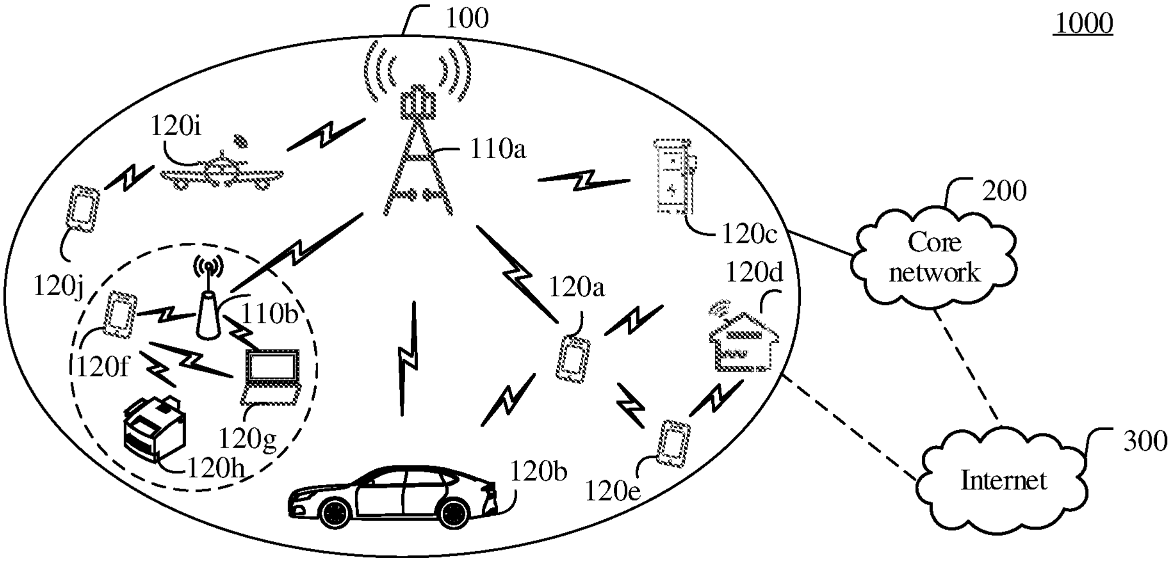
FIG. 1 is a schematic diagram of an architecture of a communication system according to an embodiment of this application.

FIG. 1 is a schematic diagram of an architecture of a communication system 1000 to which an embodiment of this application is applied. As shown in FIG. 1, the communication system includes a radio access network 100. Optionally, the communication system 1000 may further include a core network 200 and an internet 300. The radio access network 100 may include at least one network device (for example, 110*a* and 110*b* in FIG. 1), and may further include at least one terminal (for example, 120*a* to 120*j* in FIG. 1). The terminal is connected to the network device in a wireless manner, and the network device is connected to the core network in a wireless or wired manner. A core network device and the network device may be independent and different physical devices, or functions of the core network device and logical functions of the network device are integrated into a same physical device, or some functions of the core network device and some functions of the network device are integrated into one physical device. The terminals may be connected to each other in a wired or wireless manner, and the network devices may also be connected to each other in a wired or wireless manner. FIG. 1 is only a schematic diagram. The communication system may further include another network device, for example, may further include a wireless relay device and a wireless backhaul device, which are not shown in FIG. 1.

The network device may be a base station, an evolved NodeB (eNodeB), a transmission reception point (TRP), a next generation NodeB (gNB) in a 5th generation (5G) mobile communication system, a next generation base station in a 6th generation (6G) mobile communication system, a base station in a future mobile communication system, an access node in a Wi-Fi system, or the like, or may be a module or a unit, for example, a central unit (CU) or a distributed unit (DU), that completes some functions of the base station. The CU herein completes functions of a radio resource control protocol and a packet data convergence protocol (PDCP) of the base station, and may further complete a function of a service data adaptation protocol (SDAP). The DU completes functions of a radio link control layer and a medium access control (MAC) layer of the base station, and may further complete some or all of functions of a physical layer. For specific descriptions of the foregoing protocol layers, refer to related technical specifications of a 3rd generation partnership project (3GPP). The network device may be a macro base station (for example, 110*a* in FIG. 1), or may be a micro base station or an indoor base station (for example, 110*b* in FIG. 1), or may be a relay node or a donor node. A specific technology and a specific device form used by the network device are not limited in embodiments of this application. For ease of description, the following provides descriptions by using an example in which the network device is a base station.

The terminal may also be referred to as a terminal device, user equipment (UE), a mobile station, a mobile terminal, or the like. The terminal may be widely used in various scenarios, for example, device-to-device (D2D), vehicle to everything (V2X) communication, machine type communication (MTC), internet of things (IoT), virtual reality, augmented reality, industrial control, autonomous driving, telemedicine, a smart grid, smart furniture, a smart office, a smart wearable device, smart transportation, and a smart city. The terminal may be a mobile phone, a tablet computer, a computer with a wireless transceiver function, a wearable device, a vehicle, an unmanned aerial vehicle, a helicopter, an airplane, a ship, a robot, a robot arm, a smart home device, or the like. A specific technology and a specific device form used by the terminal are not limited in embodiments of this application.

The base station and the terminal may be fixed or movable. The base station and the terminal may be deployed on the land, including indoor or outdoor, handheld or vehicle-mounted, may be deployed on the water, or may be deployed on an airplane, a balloon, and an artificial satellite in the air. Application scenarios of the base station and the terminal are not limited in embodiments of this application.

Roles of the base station and the terminal may be relative. For example, a helicopter or an unmanned aerial vehicle 120*i* in FIG. 1 may be configured as a mobile base station. For the terminal 120*j* that accesses the radio access network 100 via 120*i*, the terminal 120*i* is a base station. However, for the base station 110*a*, 120*i* is a terminal, that is, 110*a* and 120*i* communicate with each other by using a wireless air interface protocol. Certainly, 110*a* and 120*i* may alternatively communicate with each other by using an interface protocol between base stations. In this case, for 110*a*, 120*i* is also a base station. Therefore, both the base station and the terminal may be collectively referred to as communication apparatuses. 110*a* and 110*b* in FIG. 1 may be referred to as communication apparatuses having a function of the base station, and 120*a* to 120*j* in FIG. 1 may be referred to as communication apparatuses having a function of the terminal.

Communication may be performed between the base station and the terminal, between the base stations, and between the terminals by using a licensed spectrum, an unlicensed spectrum, or both the licensed spectrum and the unlicensed spectrum. Communication may be performed by using a spectrum below 6 gigahertz (GHz), a spectrum above 6 GHz, or both the spectrum below 6 GHz and the spectrum above 6 GHz. A spectrum resource for wireless communication is not limited in embodiments of this application.

In embodiments of this application, the function of the base station may be performed by a module (for example, a chip) in the base station, or may be performed by a control subsystem including the function of the base station. The control subsystem including the function of the base station herein may be a control center in the foregoing application scenarios such as the smart grid, the industrial control, the smart transportation, and the smart city. The function of the terminal may alternatively be performed by a module (for example, a chip or a modem) in the terminal, or may be performed by an apparatus including the function of the terminal. When a specific communication method is described in this application, an example in which a device implementing the function of the base station is a network device is used for description, and an example in which a device implementing the function of the terminal is a terminal device is used for description.

In this application, the network device sends a downlink signal or downlink information to the terminal device, where the downlink information is carried on a downlink channel. The terminal device sends an uplink signal or uplink information to the network device, where the uplink information is carried on an uplink channel. To communicate with the network device, the terminal device needs to establish a wireless connection to a cell controlled by the network device.

The foregoing content describes the system architecture and the possible application scenario in embodiments of this application. To better understand the technical solutions of embodiments of this application, the following describes concepts of random access and a feature in embodiments of this application.

(1) Random access process: may be implemented in different methods. Each implementation method corresponds to one random access type. The random access type may include four-step random access and two-step random access. In a four-step random access process, a terminal device sends a random access preamble (preamble) to a network device, the network device returns a random access response to the terminal, and the terminal sends a message 3 (Msg3) to the network device, where the message 3 is transmitted on a physical uplink shared channel (PUSCH). In a two-step random access process, a terminal device sends a message A (msgA) to a network device, and the network device sends a message B to the terminal. The message A includes two parts, and the message A includes a preamble sent on a physical random access channel (PRACH) and a message sent on a PUSCH.

(2) Feature (feature): may also be referred to as a topic (topic) The feature in this application is a feature that a random access resource is needed. In the random access process, indication information may be carried in a message 1 or the message 3, to indicate, to the network device, information corresponding to the feature. The network device can perform subsequent transmission based on the indication information carried in the message 1 or the message 3. The following provides some examples of the feature.

For example, the feature is small data transmission, and is small data transmission in an inactive or idle state. For example, in the random access process, a terminal device in the inactive or idle state may include uplink user data in the message 3 or the msgA. A data amount of the uplink data is less than a specific threshold, and the uplink data may be referred to as small data.

For another example, the feature is coverage enhancement (CE), and uplink coverage of random access is enhanced by repeatedly sending the message 3.

For another example, the feature is a slice (slice), different slices correspond to different services and different transmission requirements, and the network device provides a targeted service by allocating a random access resource.

For another example, the feature is a reduced capability (Redcap). Compared with a common terminal, a terminal with the reduced capability supports a small bandwidth, has a low processing capability, and supports a function poorer than a function of the common terminal. In the random access process, the terminal device may include the indication information in the message 1 or the message 3, to indicate the reduced capability to the network device, so that a network can adapt to subsequent transmission.

(3) Feature combination (feature combination): may also be referred to as a topic combination. One feature combination includes a plurality of features, or one feature combination is formed by the plurality of features. For example, one feature combination includes a feature A and a feature B, and it indicates that the feature combination includes both a feature of the feature A and a feature of the feature B. Feature combinations supported by different terminal devices may be different. The following provides some examples of the feature combination.

One feature combination includes small data transmission and a reduced capability, and a first feature may be understood as small data transmission of UE with the reduced capability.

One feature combination is a combination of small data transmission and coverage enhancement, and the feature combination includes both a feature of small data transmission and a feature of coverage enhancement.

One feature combination is a combination of small data transmission, a slice, a reduced capability, and coverage enhancement.

One feature combination is a combination of a reduced capability and a slice.

One feature combination is a combination of coverage enhancement and a slice.

One feature combination is a combination of small data transmission, a reduced capability, and coverage enhancement.

One feature combination is a combination of small data transmission, a reduced capability, and a slice.

One feature combination is a combination of a reduced capability, coverage enhancement, and a slice.

One feature combination is a combination of small data transmission, a reduced capability, coverage enhancement, and a slice.

The foregoing provides examples of the feature combination, and the feature combination may further be in another possible combination form.

In this application, the feature or the feature combination may be collectively referred to as a first feature, and one first feature may be one feature, or may be one feature combination. When the first feature is described, the first feature may be one feature, or may be one feature combination. It may be understood as that the “first feature” is equivalent to a concept of “feature/feature combination”.

The network device may support one or more first features, and the terminal device may also support one or more first features. In a scenario, the network device configures a set of random access parameters for the terminal device for each first feature, and the set of random access parameters includes all parameters used for random access. In this way, a larger quantity of first features supported by the terminal device indicates a larger quantity of parameters that need to be received, and a larger quantity of parameters that need to be sent by the network device. It is doubtless that large resource consumption and power consumption are caused to both the terminal device and the network device.

On this basis, embodiments of this application provide a random access method, to reduce power consumption of a terminal device receiving a random access parameter corresponding to a first feature supported by the terminal device, and reduce energy consumption of a system.

Figure 2:
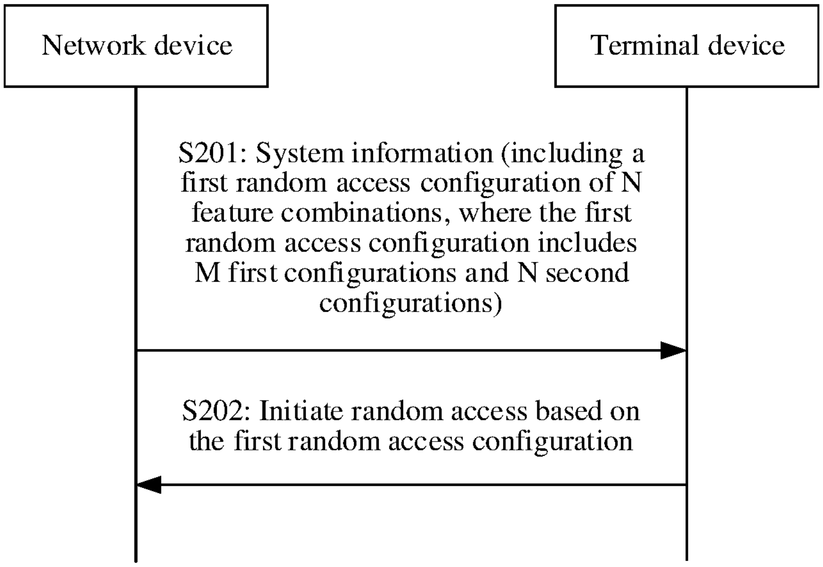
FIG. 2 is a schematic flowchart of a random access method according to an embodiment of this application.

As shown in FIG. 2, a procedure of the random access method provided in embodiments of this application is described as follows.

S201: A network device sends system information to the terminal device, and the terminal device receives the system information of the network device.

The system information indicates a first random access configuration of N first features, and one of the N first features may be one feature, or may be one feature combination.

The first random access configuration includes M first configurations and N second configurations, there is a correspondence between the M first configurations and the N second configurations, and M and N are positive integers.

Both the first configuration and the second configuration are random access configurations, and both the first configuration and the second configuration include a random access configuration parameter.

The N first features may be first features supported by the terminal device. The N first features are in one-to-one correspondence with the N second configurations. To be specific, one of the N first features corresponds to one of the N second configurations, the second configuration may also be referred to as a dedicated configuration, and the second configuration is a dedicated configuration of a first feature corresponding to the second configuration.

The first configuration may also be referred to as a common configuration, and the common configuration is a random access configuration shared by a plurality of first features.

A random access configuration of one first feature includes one first configuration and one second configuration, and both the first configuration and the second configuration are configurations corresponding to the first feature.

S202: The terminal device initiates random access based on the first random access configuration.

It can be learned from the embodiment in FIG. 2 that in this solution, an entire set of random access parameters is not separately sent for each first feature, but the random access configuration is for the N first features, and the first configuration is a shared configuration. The shared configuration may be a parameter shared by the plurality of first features. The second configuration is a dedicated configuration and is a configuration applicable to one first feature. In this way, resources for transmission of the random access configuration may be reduced, power consumption of the terminal device receiving the random access configuration may be reduced, and energy consumption of a system may be reduced.

The following describes some optional implementations of the embodiment in FIG. 2.

Figure 3:
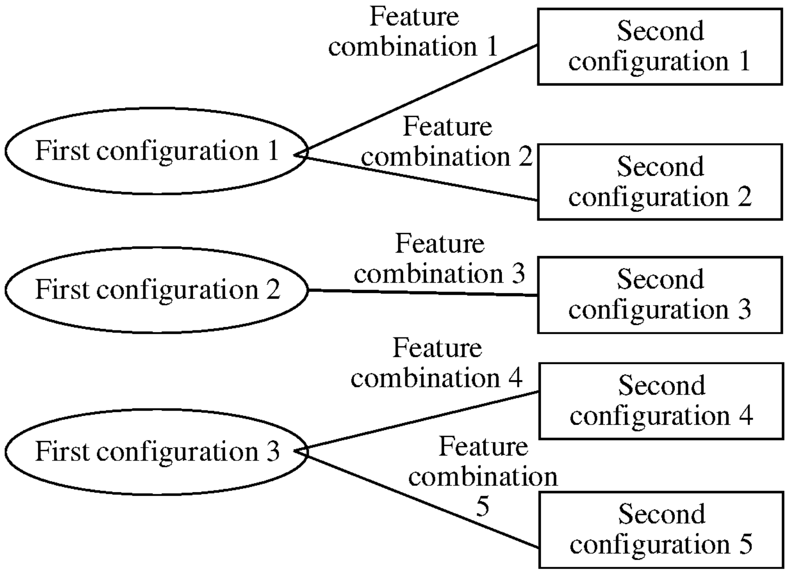
FIG. 3 is a schematic diagram of a correspondence between a first configuration and a second configuration in a random access configuration according to an embodiment of this application.

It is assumed that M=3, N=5, and the system information indicates a first random access configuration of five first features. The five first features are in one-to-one correspondence with five second configurations, that is, each first feature has a corresponding second configuration. There is a correspondence between three first configurations and the five second configurations, and one first configuration corresponds to one or more second configurations. As shown in FIG. 3, for example, the three first configurations are respectively represented by a first configuration 1, a first configuration 2, and a first configuration 3, and the five second configurations are respectively represented by a second configuration 1, a second configuration 2, . . . , and a second configuration 5. The five first features are respectively represented by a first feature 1, a first feature 2, . . . , and a first feature 5. The five second configurations are respectively dedicated configurations of the five first features. For example, the second configuration 1 is a dedicated configuration of the first feature 1, the second configuration 2 is a dedicated configuration of the first feature 2, . . . , and the second configuration 5 is a dedicated configuration of the first feature 5. It is assumed that the first configuration 1 corresponds to the second configuration 1 and the second configuration 2, the first configuration 2 corresponds to the second configuration 3, and the first configuration 3 corresponds to the second configuration 4 and the second configuration 5. It may also be understood as that the first configuration 1 is a common configuration of the first feature 1 and the first feature 2, the first configuration 2 is a common configuration of the first feature 3, and the first configuration 3 is a common configuration of the first feature 4 and the first feature 5.

Based on different random access types, the first random access configuration may be a configuration of the different random access types. On this basis, the system information may further indicate a random access type of the first random access configuration, and the random access type includes two-step random access or four-step random access. The random access type of the first random access configuration may be the two-step random access, or may be the four-step random access. Certainly, the system information may indicate two sets of random access configurations, for example, the first random access configuration and a second random access configuration. For a function, a concept, and a related embodiment of the second random access configuration, refer to the first random access configuration. The random access type of the first random access configuration is the two-step random access, and a random access type of the second random access configuration is the four-step random access. Alternatively, the random access type of the first random access configuration is the four-step random access, and a random access type of the second random access configuration is the two-step random access. In this way, the terminal device may obtain the random access configuration of the four-step random access and the random access configuration of the two-step random access. The terminal device may select, based on a type of initiated random access, a random access configuration corresponding to the type of random access.

The M first configurations and the N second configurations that are indicated by the system information may be represented in a form of a list (list). For example, the system information indicates a first configuration list and a second configuration list. The first configuration list includes the first configuration 1, the first configuration 2, . . . , and a first configuration M, and the second configuration list includes the second configuration 1, the second configuration 2, . . . , and a second configuration N. The first configuration list may also be referred to as a random access common configuration list (RA common configuration list), and the second configuration list may also be referred to as a specific configuration list (feature combination specific configuration list).

The first configuration may include one or more of the following parameters.

(1) A physical random access channel (PRACH) configuration index (Prach-configurationindex) indicates a time domain position of a PRACH and/or format information of a random access preamble.

(2) A total quantity of preambles (Total number preambles) indicates a total quantity of preambles corresponding to the first configuration. For example, the total quantity is 64.

(3) An SSB (ssb-perRACH-occasion) corresponding to each PRACH transmission occasion (RO) indicates a mapping relationship between an SSB and an RO, that is, one RO corresponds to a plurality of SSBs. One RO represents a time frequency resource for preamble transmission, includes one or more subcarriers in frequency domain, and includes one or more time domain symbols in time domain.

(4) msg1-frequency division multiplexing (FDM) indicates a quantity of frequency domain resources for a message 1. The message 1 is a preamble, and may be used for four-step random access, or may be used for two-step random access. For the two-step random access, msg1 is a preamble of a message A.

(5) A frequency domain start position of the message 1 (msg1-frequencystart) indicates a start position of the frequency domain resource for the message 1.

The foregoing describes parameters that may be included in the first configuration. When the foregoing parameters are configured as the first configuration, the terminal device may use the foregoing parameters in the first configuration for a first feature that shares the first configuration.

The second configuration may include one or more of the following parameters.

(1) An RO mask index (RO mask index) or an RO mask identifier indicates an RO subset (RO subset). For example, the RO mask index indicates an even-numbered RO, or indicates an odd-numbered RO. The terminal device may determine, based on the parameter of the RO mask index, an RO corresponding to the first feature. Specifically, one RO set may be configured by using the first configuration, and then one RO subset in the RO set may be determined based on the RO mask index.

(2) A starting preamble (Starting preamble) indicates a starting preamble corresponding to the first feature. For example, the starting preamble is a preamble whose preamble index is 10.

(3) A quantity of preambles (Preamble numbers) indicates a quantity of preambles corresponding to the first feature, and the parameter may be combined with the parameter of the starting preamble to comprehensively determine the preambles corresponding to the first feature. For example, if the starting preamble is a preamble whose preamble index is 10, and the quantity of preambles is 10, the preambles corresponding to the first feature are preambles whose preamble indexes are 10 to 19.

(4) A contention-based preamble (CB-preamblePerSSB) corresponding to each SSB indicates a correspondence between an SSB and a preamble, and one SSB corresponds to a plurality of preambles.

(5) A configuration of a group B (GroupBconfigured) indicates information about a preamble group B.

(6) A PUSCH configuration in the message A (MSGA) indicates a MSGA PUSCH resource for two-step random access. This parameter is not used for four-step random access. Alternatively, the terminal device may determine the random access type of the first random access configuration based on whether the second configuration includes the parameter. If the second configuration includes the parameter, the random access type of the first random access configuration is the two-step random access.

The parameters included in the first configuration and the second configuration are merely examples for description. During actual application, more or fewer parameters may be further included.

The following describes an optional implementation in which the system information indicates the first random access configuration of the N first features.

The system information may indicate the M first configurations and the N second configurations, or may indicate the correspondence between the M first configurations and the N second configurations.

The system information includes M pieces of first information, the M pieces of first information indicate the M first configurations, and one piece of first information indicates one first configuration. Each of the M pieces of first information includes an identifier of one or more of the N first features. In this way, an identifier of a first feature included in first information may indicate that a first configuration indicated by the first information is a common configuration of which first feature or which first features. If the first feature is a feature combination, the identifier of the first feature may be identifiers of a plurality of features included in the feature combination.

For example, if the first feature is a slice, the identifier of the first feature is an ID of the slice or an ID of a slice group (slice group).

The system information includes N pieces of second information, the N pieces of second information indicate the N second configurations, and one piece of second information indicates one second configuration. Each of the N pieces of second information includes an identifier of one of the N first features and an index of one of the M first configurations. In this way, an identifier of a first feature carried in second information may indicate that a second configuration indicated by the second information is a dedicated configuration of which first feature, and an index of a first configuration carried in the second information may indicate that the second configuration indicated by the second information is associated with which first configuration.

Indexes of first configurations may be sequence numbers of the M first configurations. For example, the sequence numbers are 0 to (M−1), or the sequence numbers are 1 to M.

It can be learned that the correspondence between the M first configurations and the N second configurations may be determined based on the identifier of the first feature in the first information and the identifier of the first feature in the second information, and there is a correspondence between the first configuration and the second configuration that are associated with the identifier of the same first feature. Alternatively, the correspondence between the M first configurations and the N second configurations may be determined based on the index of the first configuration in the second information, and there is a correspondence between the first configuration corresponding to the index of the first configuration included in the second information and the second configuration indicated by the second information.

If the system information indicates a second configuration corresponding to the first feature, but does not indicate a first configuration corresponding to the first feature, the terminal device may use a parameter in an existing random access configuration. The existing random access configuration may include an existing configuration of a four-step random access type and an existing configuration of a two-step random access type. In this case, the second configuration may further include a random access type, and the terminal device may determine the parameter in the existing random access configuration based on the random access type in the second configuration. A random access resource of the two-step random access type is configured in a random access common configuration two-step RA information element (RACH-ConfigCommonTwoStepRA IE) in the system information, and may be separated from that of the four-step random access type, or may be shared by the four-step random access type. When the random access resource of the two-step random access type is separated from that of four-step random access type, a two-step random access user may be distinguished based on an RACH resource. However, when the random access resource of the two-step random access type is shared by the four-step random access type, this is not possible and preamble partitioning needs to be used. Preamble partitioning is completed by extending a contention-based preamble region associated with the SSB and allocating an extended preamble to two-step random access. Then, two-step random access preambles may be split into a group A (Group A) and a group B (Group B). When the second configuration includes the random access type, a quantity of preambles may be extended to more than 64.

After receiving the system information, the terminal device determines a corresponding first configuration and a corresponding second configuration based on a feature or a feature combination (which is assumed to be denoted as a second feature) of random access that currently needs to be initiated, and initiates the random access based on the first configuration and the second configuration. In this application, for ease of description, the feature or the feature combination of random access that currently needs to be initiated by the terminal device may be denoted as the second feature. It may be understood that the second feature may be one feature, or may be one feature combination. When the terminal device determines a random access configuration of the second feature based on the system information, the second feature is one of the N first features.

The following provides an example of how the terminal device determines the second feature in a scenario.

Figure 4:
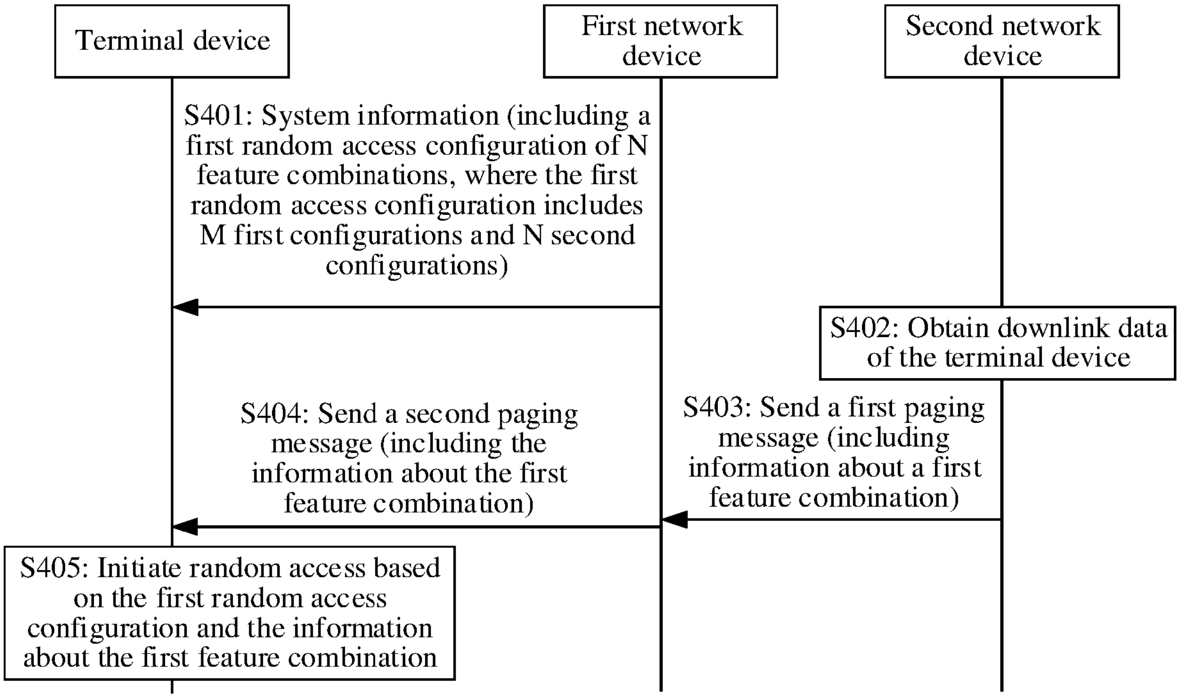
FIG. 4 is a schematic flowchart of a random access method in a scenario according to an embodiment of this application.

As shown in FIG. 4, a random access method in a scenario is described as follows.

S401: A first network device sends system information to a terminal device, and correspondingly, the terminal device receives the system information of the first network device.

This step is the same as S301. The first network device in this step is the network device in S301. For details, refer to the descriptions in S301. Details are not described herein again.

S402: A second network device obtains downlink data of the terminal device.

The second network device is a network device of a last serving cell (last serving cell) of the terminal device. The second network device receives downlink data from a UPF. A feature or a feature combination that corresponds to the downlink data is a second feature.

S403: The second network device sends a first paging message, where the first paging message carries information about the second feature. Correspondingly, the first network device receives the first paging message.

The information about the second feature indicates the feature or the feature combination that corresponds to the downlink data.

The first paging message may be an Xn message.

The first paging message may further include random access type information, and the random access type information indicates that a type of random access, of the second feature, initiated by the terminal device is two-step random access or four-step random access.

The first paging message may further include priority information, and the priority information indicates a priority of the second feature. A higher priority indicates that the terminal device preferentially initiates random access corresponding to the second feature.

S404: The first network device sends a second paging message, and the terminal device receives the second paging message.

The second paging message includes some information carried in the first paging message. For example, the second paging message carries the information about the second feature, may further carry the random access type information, and may further carry the priority information. The second paging message may be a Un message.

The terminal device obtains the information carried in the second paging message. The terminal device may determine, based on the information about the second feature carried in the second paging message, a first feature corresponding to the to-be-received downlink data.

Optionally, in S401, if the system information sent by the first network device includes random access configurations of two random access types, the random access type information carried in the second paging message may indicate a type of random access initiated by the terminal device. In S401, if the system information sent by the first network device includes only a random access configuration of one random access type, the second paging message may alternatively not carry the random access type information.

The second paging message may further include a non-contention-based random access resource corresponding to the first feature, and random access is initiated based on the non-contention-based random access resource.

S405: The terminal device initiates random access based on a first random access configuration, the information about the second feature, and a first configuration and a second configuration that correspond to the second feature.

The terminal device determines, based on the first random access configuration received in S401, a first configuration and a second configuration that correspond to the first feature. The terminal device initiates random access to the first network device based on the second paging message, the first configuration, and the second configuration. The terminal device determines to initiate two-step random access or four-step random access to the first network device based on the random access type in the second paging message.

A two-step random access process and a four-step random access process may be described as follows.

If the terminal device initiates two-step random access to the first network device, the terminal device determines, based on the first configuration and the second configuration that correspond to the second feature, a random access time-frequency resource and a preamble (message A) that correspond to the second feature. The random access time-frequency resource includes a PRACH time-frequency resource and a PUSCH time-frequency resource. The terminal device sends, to the first network device on the PRACH time-frequency resource corresponding to the second feature, the preamble corresponding to the second feature. The terminal device sends, to the first network device on the PUSCH time-frequency resource corresponding to the second feature, an RRC resume request (RRC resume request) corresponding to the second feature. The network device sends a random access response to the terminal device, where the random access response (a message B) includes a success RAR (success RAR) message, a fall back RAR (fall back RAR) message, or an RRC release (release) message. The success RAR includes a contention resolution message, and the fall back RAR may include an uplink grant (UL grant), a timing advance command (TA command), or a temporary cell radio network temporary identifier (temporary C-RNTI).

If the terminal device initiates four-step random access to the first network device, the terminal device determines, based on the first configuration and the second configuration that correspond to the second feature, a random access time-frequency resource and a preamble that correspond to the second feature, and the terminal device sends, to the first network device on the PRACH time-frequency resource corresponding to the second feature, the preamble corresponding to the second feature. The preamble may be carried in a message 1. The network device receives the preamble, and sends a message 2, namely, a random access response, to the terminal device. The terminal device receives the random access response. The random access response may include an uplink grant (UL grant), a TA command, or a temporary C-RNTI. The terminal device sends a message 3 to the network device. The message 3 may be an RRC resume request, and small data may be carried in the RRC resume request. The network device sends a message 4, namely, a contention resolution message, to the terminal device, and the terminal device receives the contention resolution message. The network device sends an RRC release (RRC release) message to the terminal device, and the terminal device receives the RRC release message. The RRC release message and the contention resolution message may be carried in the same message 4, or may be carried in different messages.

Both the foregoing two-step random access and the foregoing four-step random access include the RRC resume request. After receiving the RRC resume request, the first network device may perform the following operations, including the first network device sends a UE context resume request (Retrieve UE context request) to the second network device. Based on the UE context resume request, the first network device verifies an identity of the terminal device and identifies a context of the terminal device. The first network device receives a UE context resume response (Retrieve UE context respond), where the UE context resume response includes address information of a dedicated tunnel and context information of the terminal device. The first network device receives the downlink data through the dedicated tunnel, and generates an RRC release message based on the UE context resume response. The first network device sends the RRC release message and the downlink data to the terminal device, to complete a random access process.

In S401, the network device sends the system information to the terminal device. The system information may carry a random access configuration of two-step random access, or may carry a random access configuration of four-step random access, or may carry two sets of random access configurations. One set is used for two-step random access, and the other set is used for four-step random access. In a possible design of this embodiment of this application, before the network device sends the system information to the terminal device, the terminal device may send a request message of the system information to the network device. The request message of the system information requests system information of a specified random access type. The following describes the design in detail.

Figure 5:
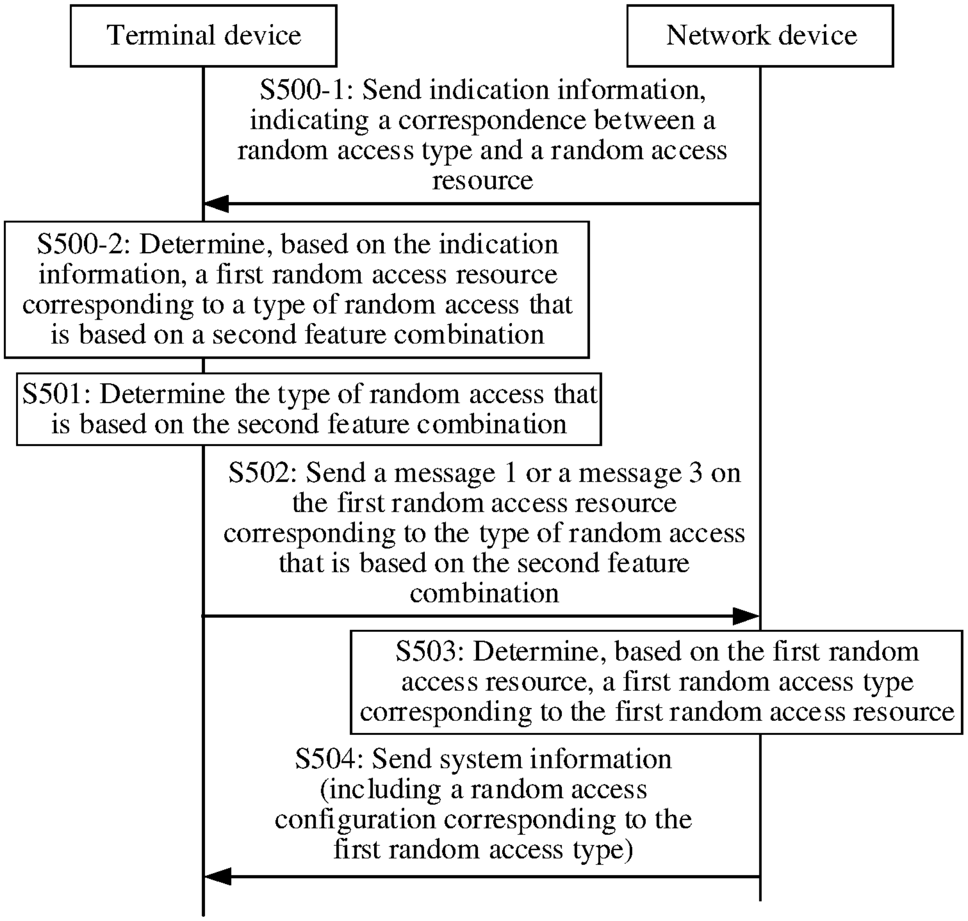
FIG. 5 is a schematic flowchart of a method for requesting system information according to an embodiment of this application.

As shown in FIG. 5, a procedure of a method for requesting system information is as follows.

S501: A terminal device determines a type of random access that is based on a second feature, where the second feature is a feature or a feature combination that is supported by the terminal device, or the second feature is a feature or a feature combination that corresponds to random access to be initiated by the terminal device. The type of random access that is based on the second feature is two-step random access or four-step random access.

S502: The terminal device sends a message 1 or a message 3 to a network device on a first random access resource corresponding to the type of random access that is based on the second feature, where the message 1 or the message 3 is used to request a first random access configuration corresponding to the type of random access that is based on the second feature. Correspondingly, the network device receives the message 1 or the message 3 on the first random access resource.

S503: The network device determines, based on the first random access resource, the type that is of random access and that corresponds to the first random access resource, where the type of random access is denoted as a first random access type.

S504: The network device sends the system information to the terminal device, where the system information includes a random access configuration corresponding to the first random access type.

Optionally, before S501, the method further includes S500-1 and S500-2.

S500-1: The network device sends indication information to the terminal device, and the terminal device receives the indication information.

The indication information indicates a correspondence between a random access type and a random access resource. For example, the random access resource indication information may indicate a random access resource corresponding to two-step random access and a random access resource corresponding to four-step random access.

S500-2: The terminal device determines, based on the indication information, the first random access resource corresponding to the type of random access that is based on the second feature.

If the terminal device determines that the type of random access that is based on the second feature is the two-step random access, and may determine, based on the random access resource indication information, the random access resource corresponding to the two-step random access, the terminal device sends the message 1 or the message 3 to the network device on the random access resource corresponding to the two-step random access. If the terminal device determines that the type of random access that is based on the second feature is the four-step random access, and may determine, based on the random access resource indication information, the random access resource corresponding to the four-step random access, the terminal device sends the message 1 or the message 3 to the network device on the random access resource corresponding to the four-step random access.

Optionally, the random access resource indication information may further indicate the message 1 or the message 3. If the random access resource indication information indicates the message 1, the terminal device sends the message 1 to the network device. The message 1 is used to request the first random access configuration corresponding to the type of random access that is based on the second feature. If the random access resource indication information indicates the message 3, the terminal device sends the message 3 to the network device. The message 3 is used to request the first random access configuration corresponding to the type of random access that is based on the second feature.

The message 1 and the message 3 may be a message 1 and a message 3 in a four-step random access process. The message 1 may alternatively be a message A in a two-step random access process.

The message 1 may be referred to as a message of a message 1-based system information request (MSG1-based SI request). After receiving the MSG1-based SI request, the network device may send a random access response to the terminal device. After receiving the random access response, the terminal device determines that the network device receives the MSG1-based SI request. The network device receives the MSG1-based SI request on the first random access resource corresponding to the type of random access that is based on the second feature. Therefore, the first random access type corresponding to the first random access resource may be determined. The network device sends the system information to the terminal device, where the system information carries the random access configuration corresponding to the first random access type.

If the terminal device requests, by using the message 3, the first random access configuration corresponding to the type of random access that is based on the second feature, before sending the message 3, the terminal device further performs steps of sending the message 1 and a message 2. For details, refer to the four-step random access process. For example, the terminal device sends a preamble to the network device, and the network device sends a random access response (RAR) to the terminal device.

It can be learned that based on a correspondence between a random access type and a random access resource, when receiving the message 1 or the message 3, the network device may determine the random access type based on the random access resource, and send a random access configuration corresponding to the random access type. Optionally, the terminal device may further include the random access type indication information in the message 1 or the message 3, and the random access type indication information indicates a preferred random access type (preferred RA type). Alternatively, the network device may send, to the terminal device based on the random access type indication information, the random access configuration corresponding to the random access type indicated by the random access type indication information.

Optionally, the terminal device may further request, by using the message 1/message 3, a random access configuration corresponding to one or more first features. When random access configurations corresponding to a plurality of first features are requested, the message 1 or the message 3 may carry a bit pattern (bit map), and the plurality of requested first features are indicated by using the bit pattern. When a random access configuration corresponding to one first feature is requested, the message 1 or the message 3 may carry an identifier of the first feature.

It may be understood that, to implement functions in the foregoing embodiments, the network device and the terminal device include corresponding hardware structures and/or software modules for performing the functions. A person skilled in the art should be easily aware that, in this application, the units and method steps in the examples described with reference to embodiments disclosed in this application can be implemented by hardware or a combination of hardware and computer software. Whether a function is performed by hardware or hardware driven by computer software depends on particular application scenarios and design constraint conditions of the technical solutions.

Figure 6:
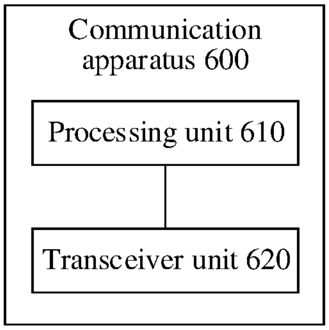
FIG. 6 is a schematic diagram 1 of a structure of a communication apparatus according to an embodiment of this application.
Figure 7:
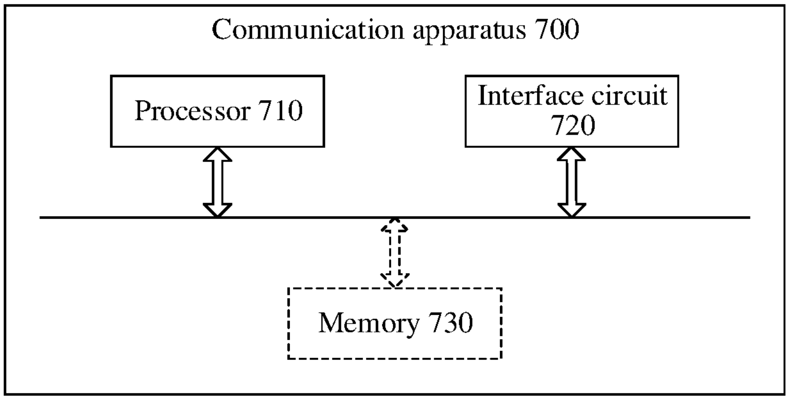
FIG. 7 is a schematic diagram 2 of a structure of a communication apparatus according to an embodiment of this application.

FIG. 6 and FIG. 7 each are a possible schematic diagram of a structure of a communication apparatus according to an embodiment of this application. The communication apparatus may be configured to implement the function of the terminal device or the network device in the foregoing method embodiments, and therefore can also implement beneficial effects of the method embodiments. In embodiments of this application, the communication apparatus may be one of the terminals 120*a* to 120*j* shown in FIG. 1, or may be the base station 110*a* or 110*b* shown in FIG. 1, or may be a module (for example, a chip) used in the terminal or the base station.

As shown in FIG. 6, the communication apparatus 600 includes a processing unit 610 and a transceiver unit 620. The communication apparatus 600 is configured to implement the function of the terminal device or the network device in the method embodiments.

When the communication apparatus 600 is configured to implement the function of the terminal device in the method embodiments, the transceiver unit 620 is configured to receive system information, and the processing unit 610 is configured to initiate random access based on a first random access configuration.

When the communication apparatus 600 is configured to implement the function of the network device in the method embodiment shown in FIG. 3, the processing unit 610 is configured to generate system information, and the transceiver unit 620 is configured to send the system information to the terminal device.

For more detailed descriptions of the processing unit 610 and the transceiver unit 620, directly refer to related descriptions in the foregoing method embodiments. Details are not described herein again.

As shown in FIG. 7, the communication apparatus 700 includes a processor 710 and an interface circuit 720. The processor 710 and the interface circuit 720 are coupled to each other. It may be understood that the interface circuit 720 may be a transceiver or an input/output interface. Optionally, the communication apparatus 700 may further include a memory 730, configured to store instructions executed by the processor 710, or store input data needed by the processor 710 to run the instructions, or store data generated after the processor 710 runs the instructions.

When the communication apparatus 700 is configured to implement the method shown in FIG. 7, the processor 710 is configured to implement the function of the processing unit 610, and the interface circuit 720 is configured to implement the function of the transceiver unit 620.

When the communication apparatus is a chip used in a terminal device, the chip of the terminal device implements the function of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to a network device.

When the communication apparatus is a module used in a network device, the module in the network device implements the function of the network device in the foregoing method embodiments. The module in the network device receives information from another module (for example, a radio frequency module or an antenna) in the network device, where the information is sent by a terminal to the network device. Alternatively, the module in the network device sends information to another module (for example, a radio frequency module or an antenna) in the network device, where the information is sent by the network device to a terminal. The module in the network device herein may be a baseband chip in the network device, or may be a DU or another module. The DU herein may be a DU in an open radio access network (O-RAN) architecture.

It should be noted that the processor in embodiments of this application may be a central processing unit (CPU), a general-purpose processor, a digital signal processor (DSP), an application-specific integrated circuit (ASIC), a field programmable gate array (Field Programmable Gate Array, FPGA) or another programmable logical device, a transistor logical device, a hardware component, or any combination thereof. The general-purpose processor may be a microprocessor or any regular processor.

Some or all of the operations and functions performed by the terminal device, or some or all of the operations and functions performed by the network device that are described in the foregoing method embodiments of this application may be implemented by using a chip or an integrated circuit.

To implement the function of the communication apparatus in FIG. 6 or FIG. 7, an embodiment of this application further provides a chip, including a processor, configured to support the communication apparatus in implementing the function of the terminal or the network device in the foregoing method embodiments. In a possible design, the chip is connected to a memory or the chip includes the memory. The memory is configured to store program instructions and data that are necessary for the communication apparatus.

An embodiment of this application provides a computer-readable storage medium, storing a computer program. The computer program includes instructions used for performing the foregoing method embodiments.

An embodiment of this application provides a computer program product including instructions. When the computer program product runs on a computer, the foregoing method embodiments are enabled to be performed.

The method steps in embodiments of this application may be implemented by hardware, or may be implemented by a processor executing software instructions. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, the storage medium is coupled to a processor, so that the processor can read information from the storage medium or write information into the storage medium. Certainly, the storage medium may alternatively be a component of the processor. The processor and the storage medium may be located in the ASIC. In addition, the ASIC may be located in a base station or a terminal. Certainly, the processor and the storage medium may alternatively exist in the base station or the terminal as discrete components.

All or some of the foregoing embodiments may be implemented by software, hardware, firmware, or any combination thereof. When the software is for implementing embodiments, all or some of embodiments may be implemented in a form of a computer program product. The computer program product includes one or more computer programs or instructions. When the computer program or instructions are loaded and executed on a computer, the procedure or functions in embodiments of this application are all or partially implemented. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible by the computer, or a data storage device, for example, a server or a data center, integrating one or more usable media. The usable medium may be a magnetic medium, for example, a floppy disk, a hard disk, or a magnetic tape, or may be an optical medium, for example, a digital video disc, or may be a semiconductor medium, for example, a solid-state drive. The computer-readable storage medium may be a volatile or non-volatile storage medium, or may include two types of storage media: the volatile storage medium and the non-volatile storage medium.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

In this application, "at least one" means one or more, and "a plurality of" means two or more than two. The term "and/or" describes an association relationship between associated objects, and represents that three relationships may exist. For example, A and/or B may represent the following cases: Only A exists, both A and B exist, and only B exists, where A and B may be singular or plural.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

What is claimed is:

1. A random access method, comprising:

receiving, by a terminal device, system information of a network device, wherein the system information indicates a first random access configuration of N first features, wherein at least one first feature of the N first features is one feature or one feature combination, wherein the first random access configuration comprises M first configurations and N second configurations, wherein there is a correspondence between the M first configurations and the N second configurations, and wherein M and N are positive integers;

receiving a paging message of the network device, wherein the paging message carries information about a second feature, wherein the information about the second feature indicates a feature or a feature combination that corresponds to downlink data to be received, and wherein the second feature is a first feature of the N first features; and initiating random access based on the first random access configuration, the information about the second feature, and on a first configuration and a second configuration that correspond to the second feature.

2. The method according to claim 1, wherein the correspondence existing between the M first configurations and the N second configurations comprises the system information comprising M pieces of first information, wherein the M pieces of first information indicate the M first configurations, and wherein each piece of first information of the M pieces of first information comprises an identifier of one or more first features of the N first features.

3. The method according to claim 1, wherein the correspondence existing between the M first configurations and the N second configurations comprises the system information comprising N pieces of second information, wherein the N pieces of second information indicate the N second configurations, and wherein each piece of second information of the N pieces of second information comprises an identifier of at least one first feature of the N first features and an index of at least one first configuration of the M first configurations.

4. The method according to claim 1, further comprising:

determining a type of random access that is based on the second feature, wherein the second feature is a first feature of the N first features, and wherein the type of random access that is based on the second feature is two-step random access or four-step random access; and sending a message 1 or a message 3 to the network device on a first random access resource corresponding to the type of random access that is based on the second feature, wherein the message 1 or the message 3 is associated with requesting the first random access configuration corresponding to the type of random access that is based on the second feature.

5. A data transmission apparatus, comprising:

one or more processors; and at least one non-transitory computer readable memory connected to the one or more processors and including computer program code, wherein the at least one non-transitory computer readable memory and the computer program code are configured, with the one or more processors, to cause the apparatus to at least:

receive system information of a network device, wherein the system information indicates a first random access configuration of N first features, wherein at least one first feature of the N first features is one feature or one feature combination, wherein the first random access configuration comprises M first configurations and N second configurations, wherein there is a correspondence between the M first configurations and the N second configurations, and wherein M and N are positive integers;

receive a paging message of the network device, wherein the paging message carries information about a second feature, wherein the information about the second feature indicates a feature or a feature combination that corresponds to downlink data to be received, and wherein the second feature is a first feature of the N first features; and initiate random access based on the first random access configuration, and the information about the second feature, and further based on a first configuration and a second configuration that correspond to the second feature.

6. The apparatus according to claim 5, wherein the correspondence existing between the M first configurations and the N second configurations comprises the system information comprising M pieces of first information, wherein the M pieces of first information indicate the M first configurations, and wherein each piece of first information of the M pieces of first information comprises an identifier of one or more first features of the N first features.

7. The apparatus according to claim 5, wherein the correspondence existing between the M first configurations and the N second configurations comprises the system information comprising N pieces of second information, wherein the N pieces of second information indicate the N second configurations, and wherein each piece of second information of the N pieces of second information comprises an identifier of at least one first feature of the N first features and an index of at least one first configuration of the M first configurations.

8. The apparatus according to claim 5, wherein the at least one non-transitory computer readable memory and the computer program code are configured, with the one or more processors, to further cause the apparatus to at least:

determine a type of random access that is based on the second feature, wherein the second feature is a first feature of the N first features, and wherein the type of random access that is based on the second feature is two-step random access or four-step random access; and send a message 1 or a message 3 to the network device on a first random access resource corresponding to the type of random access that is based on the second feature, wherein the message 1 or the message 3 is associated with requesting the first random access configuration corresponding to the type of random access that is based on the second feature.

9. A non-transitory computer readable medium storing instructions that are executable by a computer of a first communication apparatus, and wherein the instructions comprise instructions for causing the first communication apparatus to perform:

receiving system information of a network device, wherein the system information indicates a first random access configuration of N first features, wherein at least one first feature of the N first features is one feature or one feature combination, the first random access configuration comprises M first configurations and N second configurations, wherein there is a correspondence between the M first configurations and the N second configurations, and wherein M and N are positive integers;

receiving a paging message of the network device, wherein the paging message carries information about a second feature, wherein the information about the second feature indicates a feature or a feature combination that corresponds to downlink data to be received, and wherein the second feature is a first feature of the N first features; and initiating random access based on the first random access configuration, and the information about the second feature, and further based on a first configuration and a second configuration that correspond to the second feature.

10. The non-transitory computer readable medium according to claim 9, wherein the correspondence existing between the M first configurations and the N second configurations comprises the system information comprising M pieces of first information, wherein the M pieces of first information indicate the M first configurations, and wherein each piece of first information of the M pieces of first information comprises an identifier of one or more of the N first features.

11. The non-transitory computer readable medium according to claim 9, wherein the correspondence existing between the M first configurations and the N second configurations comprises the system information comprising N pieces of second information, wherein the N pieces of second information indicate the N second configurations, and wherein each piece of second information of the N pieces of second information comprises an identifier of at least one first feature of the N first features and an index of at least one first configuration of the M first configurations.

12. The non-transitory computer readable medium according to claim 9, wherein the instructions further comprise instructions for causing the first communication apparatus to perform:

determining a type of random access that is based on the second feature, wherein the second feature is at least one first feature of the N first features, and wherein the type of random access that is based on the second feature is two-step random access or four-step random access; and sending a message 1 or a message 3 to the network device on a first random access resource corresponding to the type of random access that is based on the second feature, wherein the message 1 or the message 3 is associate with requesting the first random access configuration corresponding to the type of random access that is based on the second feature.

13. The method according to claim 1, wherein there is a different correspondence between a first configuration of the M first configurations and two or more second configurations of the N second configurations.

14. The method according to claim 1, wherein the paging message further carries priority information about the second feature.

15. The apparatus according to claim 5, wherein there is a different correspondence between a first configuration of the M first configurations and two or more second configurations of the N second configurations.

16. The apparatus according to claim 5, wherein the paging message further carries priority information about the second feature.

17. The non-transitory computer readable medium according to claim 9, wherein there is a different correspondence between a first configuration of the M first configurations and two or more second configurations of the N second configurations.

* * * * *